July 19, 1960    J. J. CASAZZA, JR    2,945,389
V-TRANSMISSION BELT
Filed May 21, 1958
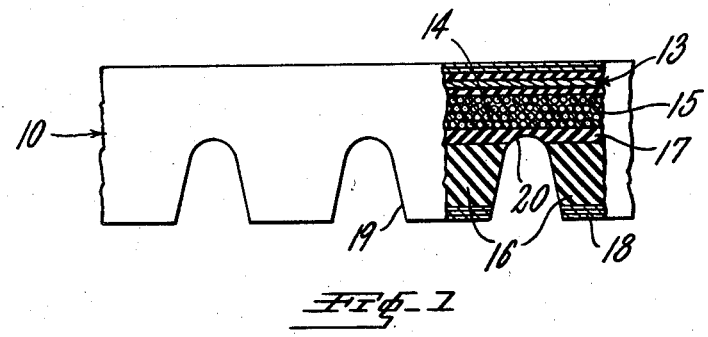
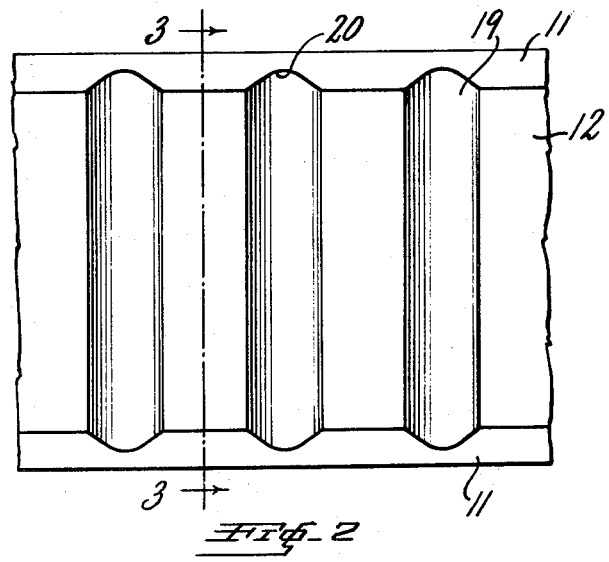
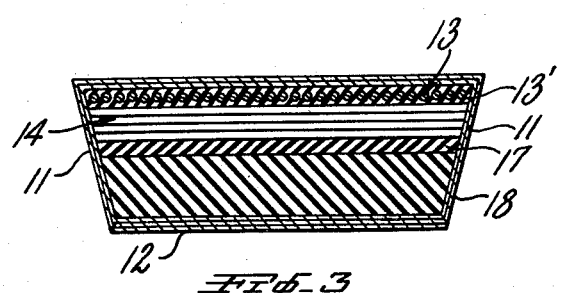
INVENTOR.
JOHN J. CASAZZA, JR.
BY
ATTORNEY

United States Patent Office 2,945,389
Patented July 19, 1960

2,945,389
V-TRANSMISSION BELT

John J. Casazza, Jr., Philadelphia, Pa., assignor to United States Rubber Company, New York, N.Y., a corporation of New Jersey Filed May 21, 1958, Ser. No. 736,850
2 Claims. (Cl. 74—233)

This invention relates to an endless transmission belt having a truncated V cross section in which the truncated side of the V cross section is provided with relatively stiff transverse sections separated by transverse grooves which extend into a flexible soft rubber layer positioned below the pull member.

The belt embodying this invention is of the class where the converging edges of the belt transmit power to the opposite converging sides of the pulley groove and are known as V and variable speed drive belts.

Heretofore belts of this class have been provided with relatively hard, stiff transverse sections on the truncated side of the belt which were united to the pull member by a soft rubber layer and are separated from each other by grooves therebetween, which extend to, but not into the soft rubber layer. In this prior construction, when the belt is flexed, as it wraps around or unwraps from the pulley, relatively high stresses are imparted to the softer rubber layer at the bottom of the grooves adjacent to the union between the stiff sections and the soft rubber layer. Such high stresses are caused by the sharp angle between the side walls of the groove and the bottom surface of the groove formed by the soft rubber layer. The high stresses in this prior construction caused a separation between the hard stiff sections and the softer layer of rubber and they also caused cracks to appear in the softer rubber layer at the bottom of the groove.

In accordance with the present invention the high stresses and the resistance to surface cracking in the soft rubber layer at the bottom of the grooves to the extent which they heretofore occurred are eliminated or reduced by extending the grooves into the softer rubber layer and also by providing the bottom surface of the grooves with a concave rounded surface.

Another feature of the present invention comprises inserting a layer of transverse cords between the soft rubber layer and the pull member to bridge the bottom of the grooves and thereby transmit the inward radial load of the pull member to the stiff transverse sections of the belt without imparting excessive working stress to the soft rubber at the bottom of the grooves which heretofore occurred by forcing such rubber toward the open end of the grooves as they pass around the pulley.

The foregoing objects and advantages of this invention are further described in the accompanying drawings, in which:

Fig. 1 is a side elevational view with parts broken away of an endless transmission belt embodying this invention;

Fig. 2 is a bottom plan view of the belt shown in Fig. 1; and

Fig. 3 is a cross-sectional view of the belt taken on line 3—3 of Fig. 2.

As shown in the drawings, the belt embodying this invention is a variable speed drive belt. Belts of this type are used in variable speed drives commonly known as the Reeves drive, comprising two pulleys, each of which having radially converging sides forming a groove therebetween having converging sidewalls with which the converging edges of the belts make contact. The distances between the converging sides of the pulleys are simultaneously varied inversely in one pulley in respect to the other to effect the change in the ratio of drive between the pulleys.

As shown in Figs. 2 and 3, the belt 10 has a truncated V cross section and the edges 11 of the belt converge towards the truncated side 12 of the belt. The edges 11 make contact with the sidewalls of the grooves in the pulleys of the drive (not shown) and the truncated side 12 of the belt faces the axes of the pulleys.

The belt comprises a pull member 13 formed of a plurality of turns or convolutions of a cord 13' lying in a single layer transversely of the belt. A longitudinally flexible and transversely stiff layer 14 of material is placed adjacent to the pull member 13. In order to provide the longitudinal flexibility and the transverse stiffness, the layer 14 is made of a plurality of tiers, or plies of transversely extending rubber treated cords 15. A layer of relatively hard, stiff transverse sections 16 are bonded to the layer 14 of cords 15 by a relatively soft layer 17 of rubber. The soft rubber layer 17 should be tough, elastic and flexible. It has a Shore A durometer reading of 58 to 62. The transversely stiff sections 16 are made of a hard rubber compound having a Shore A durometer hardness reading of 85 to 90. It is desirable to have harder rubber in the sections 16, but harder rubber fails to provide a sufficiently strong bond with the soft rubber layer 17. Therefore the range of hardness 85 to 90 is critical in order to obtain the desired rigidity and adhesion. The exterior of the belt is provided with a fabric wrapped jacket 18. The sections 16 are separated by transverse grooves 19, which are cut through the exterior jacket 18 and the layer of hard rubber 16, and into the soft rubber layer 17, but not through the latter, so as to reduce the stresses in the soft rubber layer 17 when the belt is flexed between the sections 16 as it enters and leaves the grooves of the pulleys. The grooves 19 are provided with a concavely rounded bottom surface 20 to further reduce the stresses in the soft rubber layer 17.

The textile fabric portion of the belt is treated with rubber and the rubber, or rubber treated parts of the belt are assembled in the conventional manner, and vulcanized in a mold to form a unitary bonded structure.

The improved features of the belt comprise the longitudinally flexible and transversely stiff layer 14 of material which bridges the space between the transversely stiff sections 16 so that the radial pressure of the pull member 13 will be exerted on the transversely stiff sections 16 without producing an excessive deformation of the soft rubber layer 17 at the bottom of the grooves 19, and thereby prevent the over-heating of the soft rubber layer 17 and extend the life of this rubber part. A further improved feature of the belt is the extension of the transverse grooves 19 into the soft rubber layer 17, so that when the angularity of the transverse stiff sections 16 change as they enter and emerge from the grooves of the pulleys, the stresses produced in the soft rubber 17 are distributed over a greater area and are removed from the union between the hard rubber sections 16 and the soft rubber layer 17. The concavely rounded bottom surface 20 of the grooves further reduces the concentration of stresses in the soft rubber layer, by eliminating the sharp angle at the bottom of the groove, and thus distribute the stresses over a greater area.

While the preferred form of this invention has been described and shown herein, it will be understood that changes may be made therein without departing from the spirit of the invention, and it is intended to cover such changes which come within the scope of the appended claims.

Having thus described my invention, what I claim and desire to protect by Letters Patent is:

1. An endless transmission belt having a truncated V transverse cross-sectional shape comprising a pull member, a longitudinally flexible and transversely stiff layer of material adjacent to said pull member and lying on the side thereof nearest to the truncated side of said belt, a layer of flexible soft rubber adjacent to said transversely stiff layer of material, a layer of stiff sections adjacent to said soft layer of rubber, said stiff sections being separated from each other by grooves extending through the thickness of said sections and into said soft rubber layer, and said pull member and all of the foresaid layers being bonded together.

2. An endless transmission belt as described in claim 1, in which said longitudinally flexible and transversely stiff layer of material adjacent to said pull member comprises a plurality of plies of transversely extending rubber treated cords bonded together.

References Cited in the file of this patent

UNITED STATES PATENTS

| | | |
|---|---|---|
| 1,982,869 | Heyer | Dec. 4, 1934 |
| 2,298,867 | Case | Oct. 13, 1942 |
| 2,815,671 | Talipsky et al. | Dec. 10, 1957 |